United States Patent [19]

Fernsler et al.

[11] Patent Number: 4,536,794
[45] Date of Patent: Aug. 20, 1985

[54] TELEVISION RECEIVER HAVING DIFFERENT RECEIVER SYNCHRONIZING CHARACTERISTICS IN RESPONSE TO TELEVISION SIGNAL

[75] Inventors: Ronald E. Fernsler; Sanjay R. Vinekar, both of Indianapolis, Ind.

[73] Assignee: RCA Corporation, Princeton, N.J.

[21] Appl. No.: 394,038

[22] Filed: Jun. 30, 1982

[51] Int. Cl.³ .......................... H04N 5/04; H04N 3/18
[52] U.S. Cl. .................................................... 358/158
[58] Field of Search ............. 358/158, 148, 149, 154, 358/153, 264, 267, 268, 315, 319

[56] References Cited

U.S. PATENT DOCUMENTS

| 3,715,499 | 2/1973 | Steckler | 178/69.5 TV |
| 3,795,762 | 3/1974 | Willis | 178/5.4 R |
| 3,846,584 | 11/1974 | Itoh et al. | 178/69.5 TV |
| 3,904,823 | 9/1975 | Van Straaten | 178/69.5 TV |
| 3,906,155 | 9/1975 | Van Straaten | 178/69.5 TV |
| 3,931,467 | 1/1976 | Kulkens | 178/7.3 R |
| 4,025,951 | 5/1977 | Eckenbrecht | 358/158 |
| 4,093,963 | 6/1978 | Uchida | 358/158 |
| 4,144,544 | 3/1979 | Fernsler | 358/158 |
| 4,228,461 | 10/1980 | Weissmueller | 358/148 |
| 4,228,463 | 10/1980 | Steckler et al. | 358/158 |
| 4,292,654 | 9/1981 | Steckler | 358/158 |
| 4,298,890 | 11/1981 | Lai | 358/158 |

FOREIGN PATENT DOCUMENTS 1513467 6/1978 United Kingdom ............... 358/158

Primary Examiner—Tommy P. Chin
Attorney, Agent, or Firm—Paul J. Rasmussen; Peter M. Emanuel; Scott J. Stevens

[57] ABSTRACT

A television receiver incorporates synchronizing circuitry which provides different synchronizing characteristics to accommodate different program sources. Illustratively, for receivers having vertical countdown circuits, normal broadcast signal reception causes the vertical synchronizing window to be narrow and the AFC circuits to operate normally. When the video signals originate from a nonbroadcast source, such as a video tape recorder or a video disc player, the synchronizing window is caused to be wide and the AFC circuit speed is increased. The appropriate receiver synchronizing characteristic is selected in response to the selected channel input.

16 Claims, 2 Drawing Figures

TELEVISION RECEIVER HAVING DIFFERENT RECEIVER SYNCHRONIZING CHARACTERISTICS IN RESPONSE TO TELEVISION SIGNAL

This invention relates to synchronization of television receivers and in particular to synchronization in the presence of television signals from non-broadcast signal sources.

BACKGROUND OF THE INVENTION

Synchronization of the horizontal and vertical scans of a television receiver may be accomplished by triggering the deflection circuits directly by incoming horiziontal and vertical synchronizing (sync) pulses derived from the composite video signal. Under some conditions, such as when the receiver signal is weak or there is considerable signal noise interference, the deflection circuits may fail to trigger on the proper synchronizing pulse, resulting in loss of receiver synchronization.

To provide more reliable synchronization, circuits were developed which produced horizontal and vertical rate pulses by frequency dividing a high frequency clock signal. The derived horizontal rate signal is locked to incoming horizontal sync pulses by phase lock loop circuitry to provide accurately timed synchronization of the horizontal deflection circuit.

The internally generated vertical rate pulses may also be used to provide accurate triggering of the vertical deflection circuit. The external incoming vertical sync pulses normally occur in coincidence with the internally generated vertical rate pulses, so that the internal pulses may be used to synchronize the deflection circuit. A vertical sync window having a selected time interval is chosen, during which coincidence between the internal and external pulses is expected. If coincidence is not detected for a predetermined number of fields, it may be desirable to provide synchronization by the external pulses directly.

Receiver synchronization may be adversely affected when the video source is prerecorded material from a video tape recorder. Two recorder playback heads are typically positioned on opposite sides of a rotating headwheel such that the heads alternately scan one field of information diagonally across the tape. Switching of the heads after each field causes signal transients which are desirably timed to occur just before the vertical blanking interval so that any video disruptions go unnoticed. However, head switching may cause significant disruption of the horizontal synchronizing information. If the horizontal synchronizing frequency and phase control loops respond too slowly, video displacement may be noticeable at the top of the kinescope display screen for the first several horizontal scan lines. It is possible to increase the phase control loop gain in timed coincidence with the vertical blanking interval in order to decrease the horizontal sync phase shift recovery time when using a tape recorder so that substantially all phase correction occurs during the vertical blanking interval. Although the loop gain will be increased during each vertical blanking interval regardless of the receiver program source, this feature will only be advantageously realized when using a video tape recorder.

Another problem which may occur with video tape recorders results from the use of rapid forward and reverse search modes. To provide a picture during rapid scan operation, some video information is deleted. This may be accomplished by deleting entire horizontal scan lines. Receivers which utilize internally produced vertical sync pulses, such as previously described, typically generate those sync pulses based on the known numerical relationship of the number of horizontal scan lines per field. Changes in this numerical relationship, such as occur during the rapid search mode of video tape recorders, may cause the external vertical sync pulses recorded on the tape to occur outside the internal pulse coincidence window interval, resulting in improper vertical synchronization. This problem may be corrected by enlarging the vertical sync window interval to insure that the external pulses occur within the window interval. During viewing of normal broadcast television signals, however, this may reduce vertical sync noise immunity. It is therefore desirable to provide increased horizontal phase lock loop gain and an enlarged vertical sync window only during the use of a video tape recorder.

Material recorded on video discs may also cause receiver synchronization problems. Disc eccentricity or speed variations in the master cutting stylus may cause variations in horizontal sync timing. In order to minimize any visible effect that may occur, it is desirable to increase the horizontal phase control loop gain which increases the loop response rate. However, this may increase picture jitter when receiving ordinary broadcast signals.

The previously described problems associated with video tape recorders and video disc players are effectively controlled by providing a receiver having a horizontal phase control loop with a fast response, and a large vertical sync coincidence window interval. These characteristics, although desirable for video tape and disc equipment, may undesirably compromise the operation of the receiver during ordinary broadcast signal reception or during the reception of video signals from other sources of video information where other receiver operating or synchronization characteristics may be desired.

SUMMARY OF THE INVENTION

The present invention is directed to apparatus which provide optimum receiver synchronizing characteristics for broadcast or nonbroadcast signal sources. Signal source identification is determined on the basis of the receiver channel selection. For ambiguous cases in which broadcast and nonbroadcast signals may appear on the same channel, additional identification criteria is used.

In accordance with an embodiment of the invention, a television receiver comprises a tuner for receiving television picture information signals of a first or second type. The tuner incorporates circuitry which provides a signal representative of the picture information and a first information signal type identifying signal. The tuner also incorporates signal sensing circuits responsive to the picture information representative signal for providing a second information signal type identifying signal.

Receiver synchronizing apparatus provides a first receiver synchronizing characteristic in response to a first input signal and a second receiver synchronizing characteristic in response to a second input signal.

Circuitry coupled to the tuner and to the receiver synchronizing apparatus provides either the first or the second input signal to the receiver synchronizing apparatus in response to the first and second information signal type identifying signals.

BRIEF DESCRIPTION OF THE DRAWING

In the accompanying drawing.

DETAILED DESCRIPTION

Figure 1:
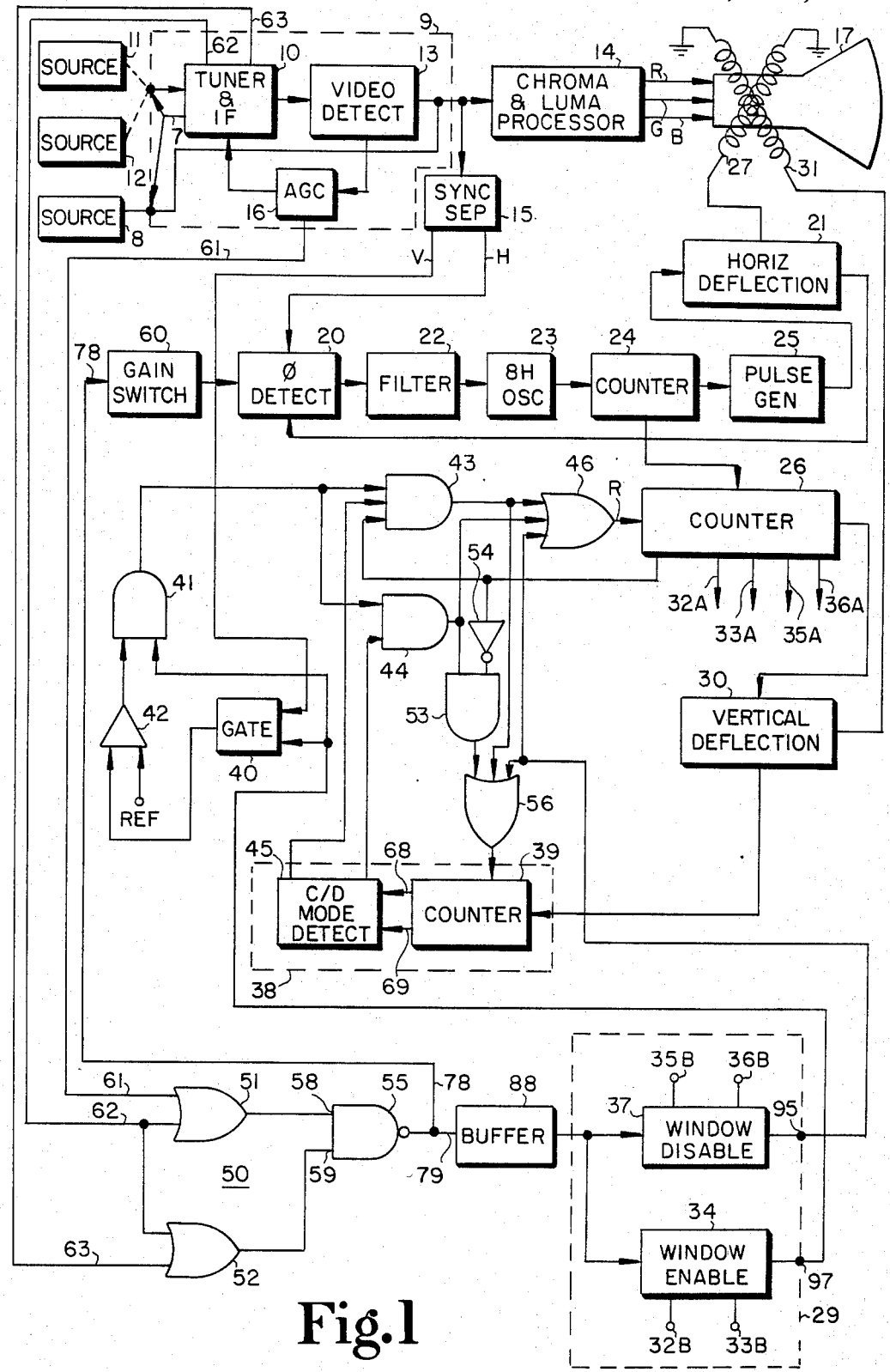
FIG. 1 is a block and schematic diagram of a television receiver in accordance with the present invention.

In a television receiver shown in FIG. 1, television signals are applied to receiving circuits 9 which comprise tuner and intermediate frequency (IF) circuits 10, video detector 13, and automatic gain control (AGC) circuits 16. Radio frequency (RF) television signals are applied to tuner and intermediate frequency (IF) circuitry 10, and may originate as transmitted programs from a source 11, such as an antenna, or as nontransmitted programs from a source 12, such as prerecorded programs from a video tape recorder or video disc player, or an input from a cable television system. Direct demodulated video program material may also be applied to receiving circuits 9 from a source 8. Source selection may be made via an input to tuner and IF circuit 10 which in turn energizes one of the source inputs, as represented by line 7. The IF signal from tuner and IF circuit 10 is demodulated by a video detector 13 to provide a composite video signal which is applied to a chrominance and luminance processor 14 and to a synchronizing pulse separator 15. Video detector 13 also provides a signal to an automatic gain control (AGC) circuit 16 which controls the gain of the IF and RF amplifier stages of circuit 10 to maintain the desired signal amplitude regardless of the input signal level. Direct video signals from source 8 do not require processing by tuner and IF circuitry 10 or video detector 13 and may be applied directly to chrominance and luminance processor 14 and sync separator 15.

Chrominance and luminance processor 14 generates the red, green and blue drive signals which energize a kinescope 17 along conductors designated R, G, B to produce red, green and blue-designated electron beams.

Synchronizing pulse separator 15 processes the composite video signal to remove the horizontal and vertical sync pulses, which are provided on lines designated H and V, respectively. The horizontal sync pulses are applied to a phase detector 20 of an automatic freqency control (AFC) circuit which also receives horizontal flyback pulses from a horizontal deflection circuit 21. The timing between the horizontal sync pulses and the flyback pulses is compared. If mistiming is detected, an error signal is generated. The error signal is processed by a filter 22 and then applied to a high frequency oscillator 23 as a control signal to adjust the oscillator frequency. Oscillator 23 is illustrated as having a frequency of 125 KHZ or 8 times the horizontal rate (in the NTSC system).

The output from oscillator 23 is applied to a frequency divider or counter 24 which illustratively produces a signal at the horizontal rate to a pulse generator 25 and a signal at twice the horizontal rate ($2f_H$) to a second frequency divider or counter 26. Pulse generator 25 produces horizontal rate switching pulses which control the operation of horizontal deflection circuit 21 in order to produce horizontal deflection currents in horizontal deflection windings 27 located on kinescope 17.

In a manner to be described later, counter 26 produces vertical rate pulses which are applied to a vertical deflection circuit 30, which generates vertical deflection current in vertical deflection windings 31, also located on kinescope 17.

The $2f_H$ pulses from counter 24 are counted by counter 26. When a pulse is received on the reset line R, counter 26 resets its count to zero and produces a pulse which is applied to vertical deflection circuit 30 in order to provide synchronization of the vertical scan. During normal receiver operation there will occur 525 pulses from counter 24 for every vertical rate field. In this case, counter 26 will be reset every 525 pulses, thereby producing internal synchronizing pulses to vertical deflection circuit 30 at a 59.94 Hz rate. The synchronizing pulse generated by counter 26 is synchronized with the external vertical sync pulse present in the incoming video signal to provide proper scanning of the displayed raster. To maintain internal synchronization, the external vertical sync pulse must occur within a window established by a particular number of pulse counts preceding and subsequent to the desired pulse count, i.e., 525. The window count interval is chosen to be a compromise between a narrow window providing noise immunity and a wide window providing rapid synchronization during out-of-sync conditions such as may be caused by channel or program changes.

As previously described, the use of a video tape recorder or video disc player may cause receiver synchronization problems not otherwise present when receiving broadcast or transmitted program material. For example, when using a video tape recorder in a fast search mode, it is desirable to provide a wide sync coincidence window to maintain a synchronized viewable picture. With either a video tape recorder or video disc player, it is also desirable to increase the horizontal AFC gain to reduce raster distortion. During viewing of broadcast programs, these characteristics may be undesirable. In accordance with the present invention, the size of the vertical sync coincidence window and the gain of the horizontal AFC circuit are adjusted in response to the video signal source. Counter 26 generates output pulses corresponding to particular $2f_H$ pulse counts in order to define the initiation and termination of the sync coincidence window. For example, during reception of broadcast programs the coincidence window illustratively occurs between the 512th and 568th pulses from counter 24. When using a video tape recorder the coincidence window illustratively occurs between the 464th and the 592nd pulses. Counter 26 generates output pulses occurring at the 464th and 512th input pulses which are applied to a window switch 29 comprising a window enable switch 34 and a window disable switch 37. The input pulses are applied via conductors 32A and 33A to input terminals 32B and 33B of window enable switch 34. Counter 26 also generates output pulses occurring at the 568th and the 592nd input pulses which are applied via conductors 35A and 36A to input terminals 35B and 36B of window disable switch 37.

The output of window enable switch 34 at a terminal 97 is coupled to the inputs of gate 40 and AND gate 41. The other input of gate 40 is coupled to the vertical sync pulse line designated V from sync separator 15. The output from gate 40 is applied to one input of comparator 42. The other input of comparator 42 is a reference voltage from a voltage source designated REF. The output of comparator 42 is applied to another input of AND gate 41. The output from AND gate 41 is coupled to inputs of AND gates 43 and 44. Counter 26 produces a pulse at the 525th count from counter 24 which is applied to another input of AND gate 43 and to an AND gate 53 via an inverter 54. Vertical deflection circuit 30 also provides a clock pulse to a counter 39 of countdown mode switch 38. Mode switch 38 also comprises a countdown mode detector 45, illustratively shown as a flip-flop. The outputs of countdown mode detector 45 are coupled to inputs of AND gates 43 and 44. The output of AND gate 43 is applied to one input of an OR gate 46 and to one input of an OR gate 56. The output of AND gate 44 is applied to another input of OR gate 46 and to AND gate 53. The output of gate 53 is applied to OR gate 56. The output of window disable switch 37 at terminal 95 is applied to other inputs of OR gates 46 and 56. The output of OR gate 46 is applied to the reset input of counter 26, and the output of OR gate 56 is applied to the reset input of counter 39.

In accordance with the present invention, the previously described selectable synchronizing characteristics are controlled by an input logic control circuit 50. Control circuit 50 comprises OR gates 51 and 52, and NAND gate 55. One input of OR gate 51 is coupled to an output of AGC circuit 16 or any noise threshold circuit along a conductor designated 61. The other input of OR gate 51 and one input of OR gate 52 are coupled to one output of tuner and IF circuit 10 by a conductor designated 62. The other input of OR gate 52 is coupled to another output of tuner and IF circuit 10 along a conductor designated 63. The output of OR gate 51 is coupled to an input 58 of NAND gate 55. The output of OR gate 52 is coupled to an input 59 of NAND gate 55. The output of NAND gate 55 is applied on a conductor 79 via a buffer circuit 88 to window enable switch 34, to window disable switch 37 and along a conductor 78 to a gain switch 60 which controls the operation of phase detector 20. Buffer circuit 88 provides appropriate interface circuits between electrical and logical components, when necessary.

The operation of the circuit shown in FIG. 1 will now be described. During reception of transmitted television signals from source 11, vertical synchronizing pulses will occur every 525 pulses of counter 26 such that internal reset of counter 26 is provided and locked synchronization of vertical deflection circuit 30 occurs. The window during which a vertical sync pulse must occur to maintain the internal counter reset is relatively narrow to provide noise immunity. With the use of a signal source such as a video tape recorder, the synchronizing window and phase detector operation must be modified for reasons previously described. The modifications are accomplished by input control circuit 50 in the following manner. For reception of channel 2, and channels 5–83, tuner and IF circuit 10 provides an output on conductor 63 that may be illustratively characterized as "low". For transmitted broadcast signals, the outputs of AGC circuit on conductor 61 and tuner and IF circuit 10 on conductor 62 will also be "low". The outputs of OR gates 51 and 52 will therefore be low causing the output of NAND gate 55 to be high. This output from NAND gate 55 will cause window enable switch 34 to become responsive to an input at terminal 32B and window disable switch 37 to become responsive to an input at terminal 35B. As an illustrative example, window enable switch 34 is therefore responsive to a pulse occurring at the 512th count of counter 26 and window disable switch 37 is therefore responsive to a pulse occurring at the 568th count of counter 26. Gain switch 60 is controlled to provide normal loop gain of phase detector 20.

When window enable switch 34 becomes responsive, a pulse is applied to one input of gates 40 and 41. Vertical sync pulses from sync separator 15 are integrated and applied to the other input of gate 40. When coincidence between these pulses occurs, gate 40 is enabled and conducts the integrated initial pulse to comparator 42. When the level of the integrated vertical pulse from gate 40 exceeds the level of the voltage of the REF source, comparator 42 provides an output to AND gate 41, where coincidence with the vertical sync pulse occurs, causing AND gate 41 to produce an output. Comparator 42 and AND gate 41 are used in conjunction with gate 40 to provide noise immunity and protection against false triggering of the vertical synchronizing circuit.

The output of AND gate 41 is applied to AND gate 43 which also receives inputs from counter 26 occurring at the 525th count and from countdown mode detector 45 of mode switch 38. The output of AND gate 41 is also applied to AND gate 44, which also receives an input from countdown mode detector 45. Mode switch 38 is shown as a means for controlling the switching of the synchronization of vertical deflection circuit 30 between internal and external synchronization.

Counter 39 of mode switch 38 is incremented at the vertical field rate by pulses from vertical deflection circuit 30. Counter 39 is reset by the output of OR gate 56 if the inputs to OR gate 56 indicate that the current receiver synchronization mode is correct. If, for example, the receiver is in an internal synchronization mode and an out-of-sync field occurs, counter 39 will not be reset, but will count successive out-of-sync fields until a predetermined number is reached, at which time a signal is provided to countdown mode detector 45 which generates an appropriate pulse that causes the receiver to switch to an external synchronization mode. Likewise, in-sync fields occurring while in the external synchronization mode are counted and the appropriate signal is applied to countdown mode detector 45. Signals generated by counter 39 are applied to countdown mode detector 45 via conductors 68 and 69.

OR gate 46 receives inputs from AND gates 43 and 44 and window disable switch 37, and provides an output which resets counter 26 and causes counter 26 to generate a synchronizing pulse which is applied to vertical deflection circuit 30. AND gate 43 provides an output pulse for internal synchronization at the 525th count of counter 26. AND gate 44 provides an output pulse for external direct synchronization of vertical deflection circuit 30. Window disable switch 37 provides a pulse to OR gate 46 to reset counter 26 at the end of the window interval if a vertical sync pulse is not found while in the internal synchronization mode. As previously described, counter 39 of mode switch 38 is incremented by a field-rate pulse from vertical deflection circuit 30 in order to maintain a count of the number of successive fields of a particular synchronization mode in order to determine when switching between internal and external synchronization should occur.

Video tape recorders and video disc players operate with a television receiver that is illustratively tuned to either channel 3 or channel 4. When the receiver shown in FIG. 1 is turned to either of these channels, tuner and IF circuit 10 provides a high output signal on conductor 63 which causes the output of OR gate 52 and consequently the level at input 59 of NAND gate 55 to go high. If the signal on conductor 61 from AGC circuit 16 is low, indicating a transmitted signal, the level at input 58 will be low and the output of NAND gate 55 will remain high. The synchronizing window interval and the gain switch 60 will therefore operate as in response to normal transmitted signals on other channels.

When a video tape recorder or video disc player is used, however, the output of AGC circuit 16 on conductor 61 will be high indicating a strong signal. The output from AGC circuit 16 will therefore provide a high level signal to an input of OR gate 51 and consequently a high signal to input 58 of NAND gate 55. This causes the output of NAND gate 55 to go low. A low signal from NAND gate 55 will cause window enable switch 34 to become responsive to a signal on conductor 33B and window disable switch 37 to become responsive to a signal on conductor 36B. Illustratively, conductor 33B will carry a signal having pulses which occur at the 464th count of counter 26 and conductor 36B will carry a signal having pulses which occur at the 592nd counter of counter 26. Gain switch 60 will also control the operation of phase detector 20 so as to increase the phase locked loop gain of phase detector 20 to compensate for video tape recorder or video disc player-induced synchronizing distortions. The use of AGC circuit 16 output therefore removes any ambiguity as to the program material source which occurs when channels 3 and 4 are selected. When an integrated circuit implementation of the countdown and synchronization circuit of FIG. 1 is used, gate 55 of input circuit 50 may be integrated so that only two integrated circuit terminals (i.e., inputs 58 and 59) are required.

It is of course possible to use nonassigned channel numbers, such as 93 or 94, to select a nonbroadcast source. This would remove any ambiguity as to the program source for a given channel number, and would therefore eliminate the need for AGC-related signals by input circuit 50.

Figure 2:
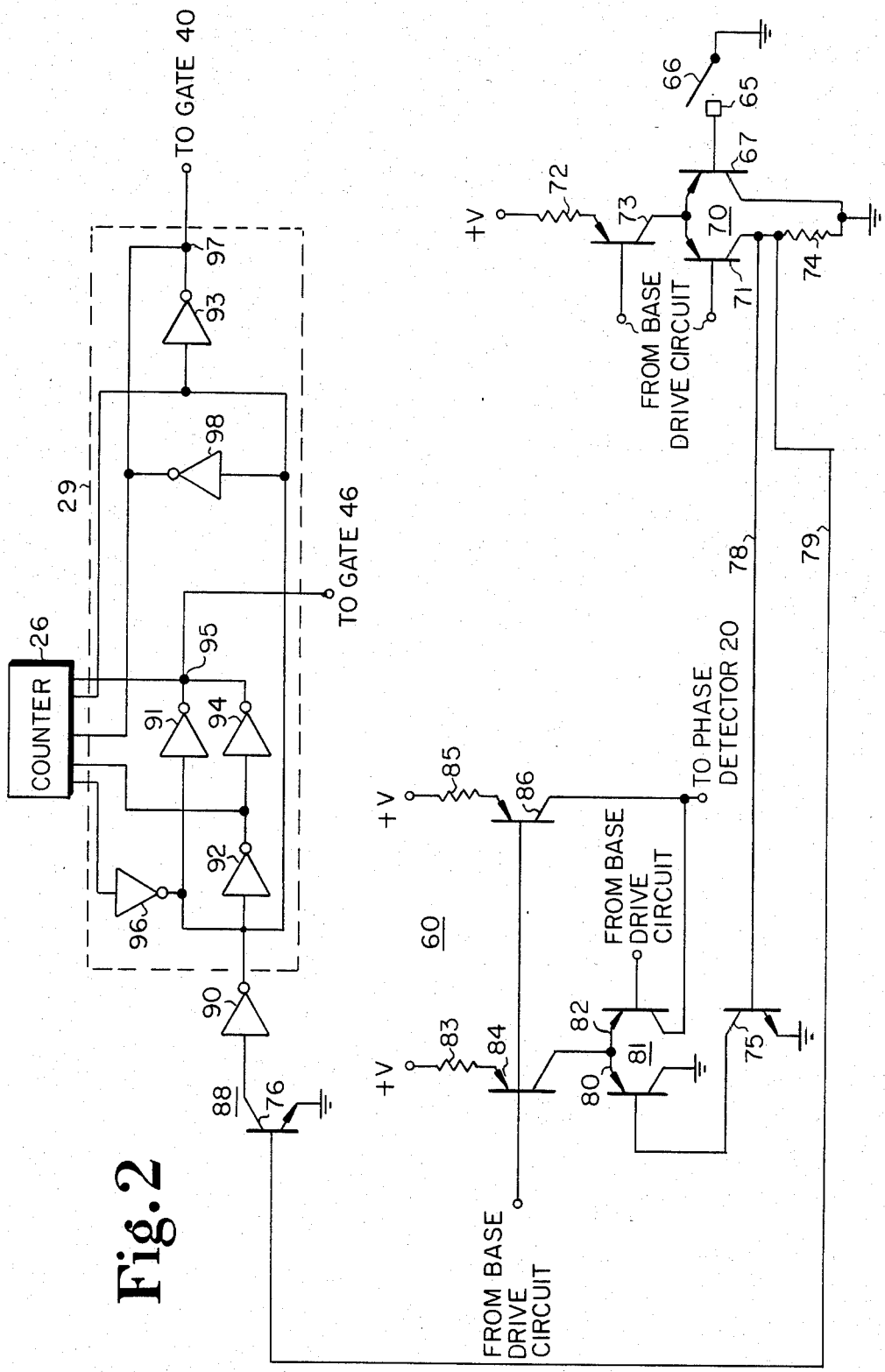
FIG. 2 is a block and schematic diagram of a particular embodiment of a portion of a receiver such as is shown in FIG. 1.

It may also be desirable to provide direct or baseband video information recorded on video tape or video disc to the receiver directly, such as from source 8, thereby bypassing the tuner and IF circuitry and the video detector. The selection of direct video input may also be made by selecting a nonassigned channel number, as previously described. When direct video input is selected, tuner and IF circuit 10 produces a high signal on conductor 62, which causes inputs 58 and 59 of NAND gate 55 to go high. The output of NAND gate 55 is therefore low, providing the wide synchronizing window and high phase detector loop gain that is desired with video tape and video disc programs, as previously described. Input circuit 50 therefore controls the characteristics of the synchronizing window and phase detector in correct response to the type or feature conditions of the program source that is supplying information to the television receiver. When unambiguous channel numbers are used to select nonbroadcast or nontransmitted signal inputs, only one input terminal is required for integrated circuit purposes. Referring to FIG. 2, there is shown an integrated circuit implementation of a portion of a single input countdown and synchronization circuit similar to that shown in FIG. 1. Corresponding elements in FIGS. 1 and 2 will be identified with the same reference numerals.

The sole integrated circuit interface terminal 65 is coupled to a switch 66 external to the integrated circuit. Switch 66 selectively couples terminal 65 to ground or leaves it open. This switching may be done automatically in response to a channel selection or it may be accomplished by way of a mechanical switch on the receiver.

The state or condition of terminal 65 is applied to the base of a transistor 67, one transistor of a differential amplifier 70. A transistor 71 forms the other half of differential amplifier 70. The emitters of transistors 67 and 71 are coupled to a source of potential designated +V through a resistor 72 and the emitter-collector path of a transistor 73. Base drive for transistors 71 and 73 and for other integrated transistors not otherwise specifically described is provided by conventional transistor base drive circuits incorporated within the integrated circuit. The collector of transistor 67 is grounded; the collector of transistor 71 is coupled to ground via a resistor 74 and to the bases of transistors 75 and 76 via conductors 78 and 79, respectively. The collector of transistor 75 of gain switch 60 is coupled to the base of a transistor 80 which comprises a differential amplifier 81 with transistor 82. The collector of transistor 82 is coupled to phase detector 20 in order to change the gain or speed of the phase detector phase locked loop. Differential amplifier 81 is also coupled to the source of potential +V via a resistor 83 and the emitter-collector path of a transistor 84. The source of potential +V is also coupled to phase detector 20 via a resistor 85 and the emitter-collector path of a transistor 86.

Transistor 76 and gate 90 comprise buffer 88 which assumes an output condition in response to the collector voltage of transistor 76. The output of gate 90 is applied to window switch 29 via the input of gates 91, 92, 93 and 98. The output of gate 92 is applied to a gate 94, which provides an output to a terminal 95. Gate 91 also provides an output to terminal 95.

Counter 26 comprises a number of cascaded flip-flops which form a binary ripple-through counter. The outputs of selected flip-flops may therefore be combined to provide pulses which correspond to particular counter values. In the embodiment shown in FIG. 2, counter 26 illustratively provides 40 count pulses to the input of gate 91 via a gate 96, 64 count pulses to the input of gate 94, 464 count pulses to a terminal 97 which is also coupled to the output of gate 93, 512 count pulses to the input of gate 93, and 528 count pulses to terminal 95. Terminal 95 is coupled to OR gate 46 and terminal 97 is coupled to gate 40.

The operation of the circuit of FIG. 2 will now be described. When normal broadcast signals are being received, switch 66 is open causing the potential of terminal 65 (and the base of transistor 67) to rise above ground. This causes transistor 71 to conduct, creating a voltage drop across resistor 74 which turns transistors 75 and 76 on.

Conduction of transistor 75 decreases the base voltage of transistor 80, causing transistor 82 to turn off. Operating current for phase detector 20 is therefore provided through resistor 85 and transistor 86. This current is illustratively of the order of 150 $\mu$A.

Conduction of transistor 76 lowers its collector voltage which causes the output of gate 90 to go high. Gate 91 is enabled, while gate 94 is disabled, causing a 40-count pulse from counter 26 to be ANDed with a 528-count pulse from counter 26, producing a 568-count pulse at terminal 95. Gate 93 is also enabled, causing the 512-count pulse to appear at terminal 97. The 464-count pulse is disabled via gate 98. The 512- and 528-count pulses therefore define a narrow synchronization window that is desired when receiving normal transmitted signals.

When using a video tape recorder or video disc player, or when direct video signals are being received by the television receiver, switch 66 is caused to be closed, thereby grounding terminal 65 and the base of transistor 67. This causes transistor 71 to turn off, decreasing its collector voltage and turning transistors 75 and 76 off. Nonconduction of transistor 75 turns off transistor 80, causing transistor 82 to conduct. This provides an additional operating current of illustratively 240 $\mu$A via resistor 83 and transistor 84 that is added to the 150 $\mu$A current that is supplied to phase detector 20, resulting in a total current of 390 $\mu$A, which causes rapid correction of any video line displacement that may occur.

Nonconduction of transistor 76 enables gate 90, enabling gate 94 and disabling gate 91. This causes the 64-count pulse from counter 26 to be ANDed with the 528-count pulse from counter 26, producing a 592-count pulse at terminal 95. Enabling of gate 90 also disables gate 93 which allows the 464-count pulse from counter 26 to appear at terminal 97. The 464 and 592 count pulses therefore define a wide synchronization window which is desirable when using video tape recorders and video disc players. The circuit described with respect to FIG. 2 therefore illustrates one embodiment of gain switch 60, and window switch 29 shown in FIG. 1.

The circuits shown in FIGS. 1 and 2 have been described as embodying digitally generated numerical countdown pulses. It is possible to define synchronization window limits as a function of analog levels of the vertical deflection waveform, so that particular voltage or current levels of the deflection waveform would define the window opening and closing points. With this arrangement, a noncountdown deflection circuit could be utilized.

What is claimed is:

1. A television receiver comprising:
   means for receiving picture information signals from first and second different signal source types incorporating means responsive to tuner operation for producing a plurality of signals representative of respective features associated with said signal source types;
   logic means responsive to said plurality of signals for identifying the signal source type providing said picture information signals;
   a receiver deflection system; and
   receiver synchronizing means coupled to said receiving means and said deflection system for synchronizing operation of said deflection system with respect to said picture information signals, said receiver synchronizing means coupled to said logic means and operating in a first mode in response to identification of said first signal source type and operating in a second mode in response to identification of said second signal source type.

2. The arrangement defined in claim 1 wherein said receiver synchronizing means comprises vertical synchronizing means incorporating means for generating a synchronizing window interval having a first duration in said first receiver synchronizing means operating mode and having a second duration longer than said first duration in said second receiver synchronizing operating mode.

3. The arrangement defined in claim 2, wherein said receiver synchronizing means comprises horizontal synchronizing means incorporating frequency control means operating at a first synchronizing rate in said first receiver synchronizing means operating mode and operating at a second rate faster than said first rate in said second receiver synchronizing means operating mode.

4. The arrangement defined in claim 3, wherein a first feature associated with said picture information signals comprises said picture information signal being received as baseband video signals in one feature condition and as an rf modulated signal in another feature condition.

5. The arrangement defined in claim 3, wherein a second feature associated with said picture information signals comprises said picture information signal having strong signal characteristics in one feature condition and weak signal characteristics in another feature condition.

6. The arrangement defined in claim 5, wherein a third feature associated with said picture information signal comprises said picture information signal being received on a first plurality of channel designations in one feature condition and on a second plurality of channel designations in another feature condition.

7. The arrangement defined in claim 6, wherein said first plurality of channel designations comprises channels 3 and 4, and said second plurality of channel designations comprises channels 2 and 5 through 83.

8. The arrangement defined in claim 3, wherein a fourth feature associated with said picture information signal comprises said picture information signal being received on a nonassigned channel designation in one feature condition and on an assigned channel designation in another feature condition.

9. The arrangement defined in claim 4, wherein said logic means identifies the signal source type as said second signal source type in response to the identification of said one feature condition of said first feature.

10. The arrangement defined in claim 6, wherein said logic means identifies the signal source type as said second signal source type in response to the combination of the identification of said one feature condition of said second and third features.

11. The arrangement defined in claim 8, wherein said logic means identifies the signal source type as said second signal source type in response to the identification of said one feature condition of said fourth feature.

12. A television receiver comprising:
   means for receiving television picture information signals from first and second different types of signal sources, and providing an output signal identifying said television picture information signals by particular channel designations;
   means responsive to said picture information signal for providing a signal representative of the strength of said picture information signal;
   receiver synchronizing means providing a first receiver synchronizing characteristic in response to a first input signal and providing a second receiver synchronizing characteristic in response to a second input signal; and
   means coupled to said receiving means, to said signal strength means, and to said receiver synchronizing means for providing said first input signal to said receiver synchronizing means in response to said receiving means output signal identifying one of a first plurality of particular channel designations; for providing said first input signal to said receiver synchronizing means in response to the combination of said receiving means output signal identifying one of a second plurality of particular channel designations and said signal strength representative signal being below a predetermined level; for providing said second input signal to said receiver synchronizing means in response to the combination of said receiving means output signal identifying one of said second plurality of particular channel designations and said signal strength representative signal being above said predetermined level; and for providing said second input signal to said receiver synchronizing means in response to said receiving means output identifying one of a third plurality of particular channel designations.

13. The arrangement defined in claim 12 wherein said signal strength providing means comprises automatic gain control circuitry.

14. Apparatus for use in a television receiver for receiving television signals respectively identified by particular channel designations, said receiver incorporating a tuner having means for selecting one of said particular channel designations in order to receive the associated one of said television signals, said apparatus comprising:
first means coupled to said tuner and responsive to said selected channel designation for producing a first output signal when said selected channel designation is within a group of assigned channel designations and for producing a second output signal when said selected channel designation is within a group of nonassigned channel designations; and
second means coupled to said first means for providing first receiver synchronizing characteristics in response to said first output signal and for providing second receiver synchronizing characteristics in response to said second output signal.

15. A television receiver for receiving television signals from a plurality of different source types, comprising:
means for developing a signal identifying said source type;
vertical synchronizing means incorporating means for generating a synchronizing window interval of a first duration in response to a first input signal and of a second duration longer than said first duration in response to a second input signal; and
means coupled to said identifying signal developing means for providing said first input signal or said second input signal to said vertical synchronizing means in response to said identifying signal.

16. A television receiver for receiving television signals from a plurality of different source types comprising:
means for developing a signal identifying said source type;
vertical synchronizing means incorporating means for providing a vertical synchronizing window having a first duration in response to a first input signal and providing a vertical synchronizing window having a second duration in response to a second input signal;
horizontal synchronizing means incorporating phase locked loop means operating at a first rate in response to a third input signal and operating at a second rate in response to a fourth input signal; and
means coupled to said identifying signal developing means, to said vertical synchronizing means and to said horizontal synchronizing means for selectively providing said first through fourth input signals in response to said developed identifying signal.

* * * * *